June 25, 1929.  J. S. KINNEY  1,718,362
SEPARABLE JUNCTION BLOCK
Filed Sept. 8, 1921   2 Sheets-Sheet 1
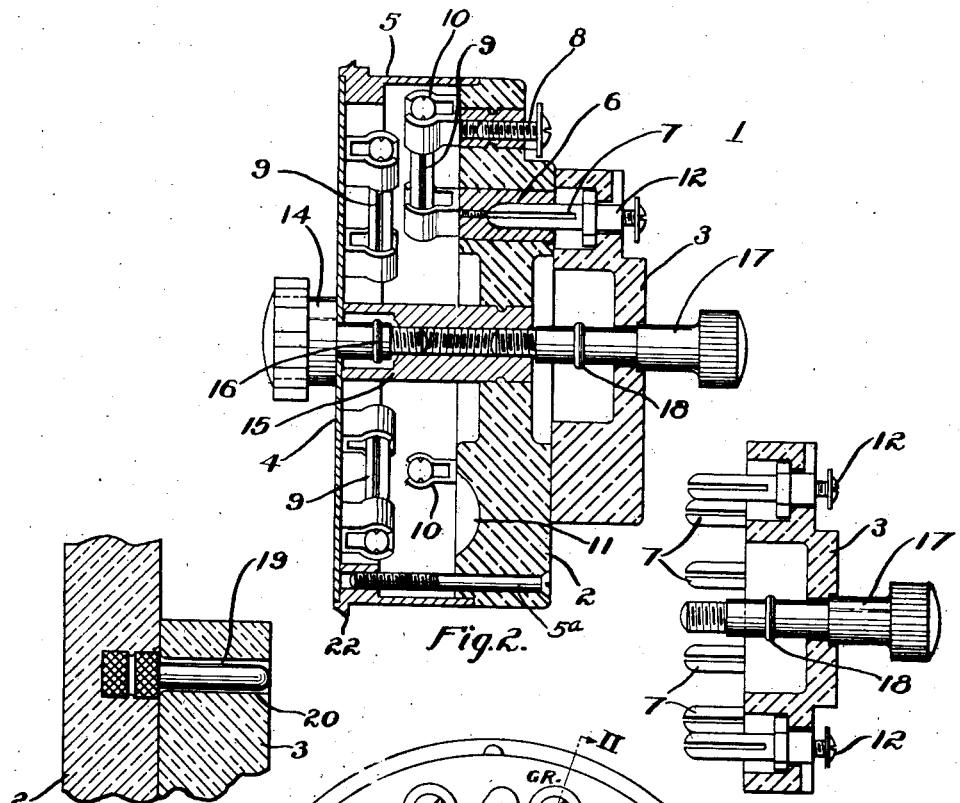
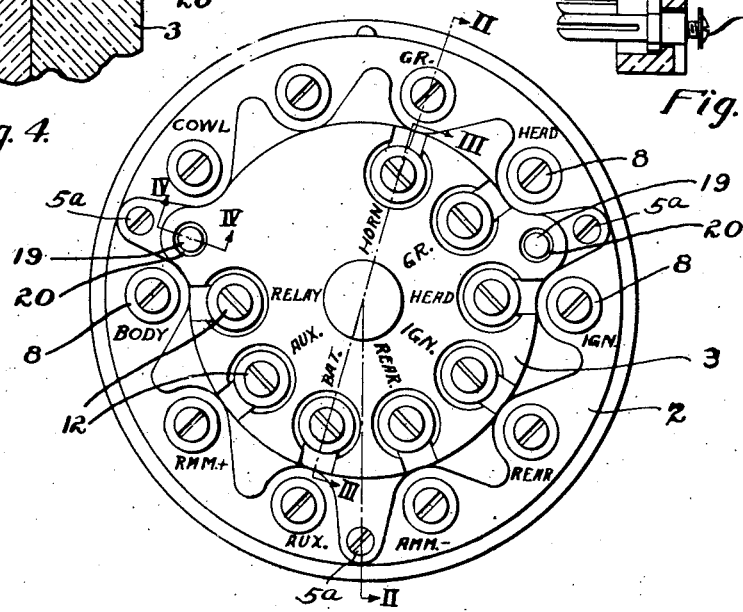
WITNESSES:
L. F. Sonnemann.
J. R. Langley
INVENTOR
J. Stanley Kinney.
BY
Wesley G. Carr
ATTORNEY June 25, 1929.  J. S. KINNEY  1,718,362
SEPARABLE JUNCTION BLOCK
Filed Sept. 8, 1921  2 Sheets-Sheet 2

WITNESSES:
L. F. Sonnemann.
J. R. Langley

INVENTOR
J. Stanley Kinney.
BY
Wesley G. Carr
ATTORNEY

Patented June 25, 1929.

1,718,362

UNITED STATES PATENT OFFICE.

J. STANLEY KINNEY, OF WILKINSBURG, PENNSYLVANIA, ASSIGNOR, BY MESNE ASSIGNMENTS, TO ECLIPSE MACHINE COMPANY, OF ELMIRA HEIGHTS, NEW YORK, A CORPORATION OF NEW YORK.

SEPARABLE JUNCTION BLOCK.

Application filed September 8, 1921. Serial No. 499,326.

My invention relates to junction blocks and it has particular relation to junction blocks that are adapted for use in connection with motor vehicles.

My invention has for one of its objects to provide a device of the character described above that shall constitute a simple and efficient means for conveniently assembling or separating certain portions of the electrical circuits of motor vehicles.

A second object of my invention is to provide an arrangement whereby the electrical circuits of the body and the chassis, respectively, of a motor vehicle may be permanently connected when these parts are not in assembled relation.

In the construction of motor vehicles, it has been necessary, heretofore, to complete the connections of the various electrical circuits after the body portion was mounted upon the chassis. In case the body was removed from the vehicle, it has been necessary to derange the permanent connections of the system in order to separate the corresponding electrical apparatus. These operations not only require considerable time but they are also undersirable because of the possibility of inaccurate connections when the vehicle parts are again assembled.

According to the present invention, I provide a separable junction block, the terminals of the detachable parts of which are electrically connected to the electrical devices mounted respectively on the chassis and the body portion of a motor vehicle. All of the circuits of the respective portions of the vehicle are connected to the corresponding part of the junction block before the body is mounted upon the chassis. When the vehicle is assembled, it is only necessary to place the parts of the junction block in operative relation and the connections of the electrical system are completed. In case of removal of the body of an automobile or other motor vehicle, it is only necessary to separate the detachable connectors of the respective parts of the junction block and the connections of the various circuits are otherwise undisturbed.

In the accompanying drawings,

Figure 1 is a rear end view of a junction block embodying my invention;

Fig. 2 is a view in section taken on line II—II of Fig. 1;

Fig. 3 is a sectional view, taken on the line III—III of Fig. 1, of the detachable member of the junction block;

Fig. 4 is an enlarged sectional view, taken on line IV—IV of Fig. 1, of one of the dowel pins and its related parts;

Figure 6:
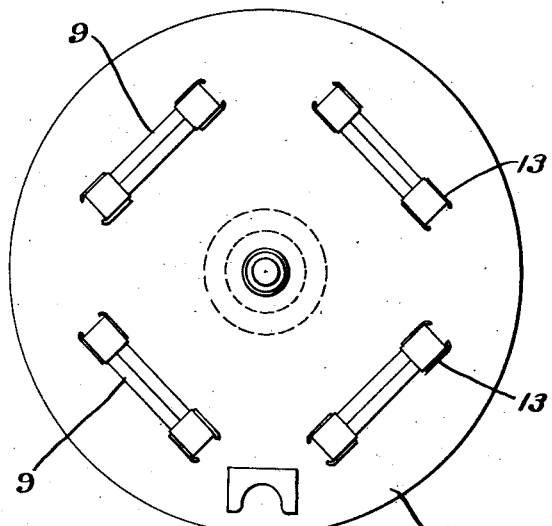
Fig. 6 is a front end view of the interior face of the cover plate with spare fuses in position.

Referring particularly to Figs. 1 to 6 of the drawings, a junction block 1 comprises a base member 2 of insulating material, a member 3 of similar material that is separable therefrom and which may be designated the "detachable member", a cover plate 4 and a spacing ring 5 for separating the base member 2 from the cover plate 4. The spacing ring 5 is detachably connected to the member 2 by screws 5ª. The base member 2 is provided with any desired number of contact members in the form of tubular inserts 6 for the reception of corresponding projecting plug contact members 7 with which the detachable member 3 is provided. The contact members 6 and 7 are preferably arranged at points equidistant from the axis of the junction block 1.

The base member 2 is also provided with terminal members 8 that are connected through suitable fuses 9 to the contact members 6. The number of terminal members 8 may be more than that of the contact members 6 since certain of the circuits have common connections. The fuses 9 are mounted in clips 10 on the face of the base member 2 that is adjacent to the cover plate 4. Recesses 11 are provided in the face of the base member 2 adjacent to the respective fuses 9 whereby the fingers of the operator may easily grasp the fuses for the purpose of removing them. This arrangement permits the clips 10 to be relatively short and space is thereby conserved. The contact members 7 are respectively provided with terminal members 12 that are similar to the terminal members 8.

The cover plate 4 is provided on its interior face with dummy fuse clips 13 of any desired number for the purpose of carrying spare fuses. The cover plate 4 is secured in position by a thumb-screw 14 which coacts with a centrally disposed screw-threaded post 15 that is secured to the base member 2. The thumb-screw 14 is provided with a ring 16 for engaging the inner side of the cover plate when the thumb-screw has been withdrawn from the post 15.

The detachable member 2 is provided with a similar thumb-screw 17 which coacts with the screw-threaded post 15 in a similar manner to secure the member 2 in operative position. A ring 18 on the shank of the thumb-screw 17 enables the latter to operate as a handle in the manner described in connection with the thumb-screw 14 and cover plate 4. As shown in Figs. 1 and 4, the base member 2 is provided with two dowel pins 19 which coact with corresponding openings 20 in the member 3 and that serve as guide members when the members 2 and 3 are being connected. They also insure that the members 2 and 3 cannot be assembled in improper relation.

The junction block is preferably mounted on the dash board of an automobile in an opening through which the block projects until the cover plate is nearly flush with the surface of the dash board. The spacing ring 5 is provided with an annular ring 22 to constitute a shoulder for fixing the position of the block within the opening.

When the electrical apparatus is installed, the connections of the various instruments and electrical apparatus that are mounted within or upon the body portion of the vehicle are connected to the terminal members 8 of the base member 1. The electrical connections of the various apparatus mounted upon the chassis are connected to the proper terminal members 12 of the detachable member 3. When the automobile is assembled, it is only necessary to place the detachable member 3 in operative position with the plug contact members 7 in engagement with the contact members 6 to complete the various electrical circuits. The thumb-screw 17 then secures the member 3 in position.

In case it is desired to inspect or replace the fuses 9, it is only necessary for the driver to remove the cover plate 4 in order to expose the adjacent face of the base member 2 which serves as a fuse block. Spare fuses that are carried by the cover member may be used if necessary.

Figure 7:
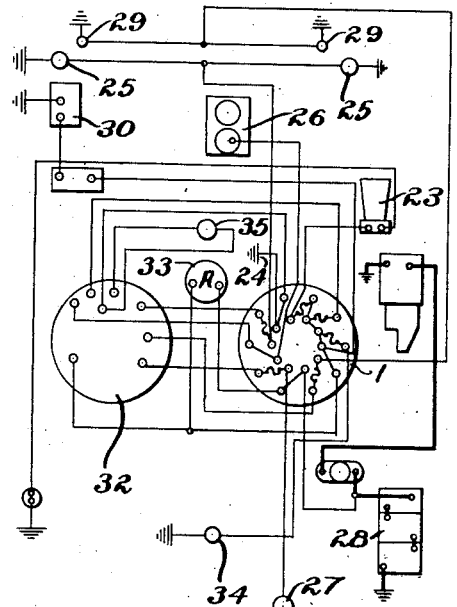
Fig. 7 is a diagrammatic view of circuits and apparatus of a motor vehicle, the connections of which are completed by a junction block.
Figure 5:
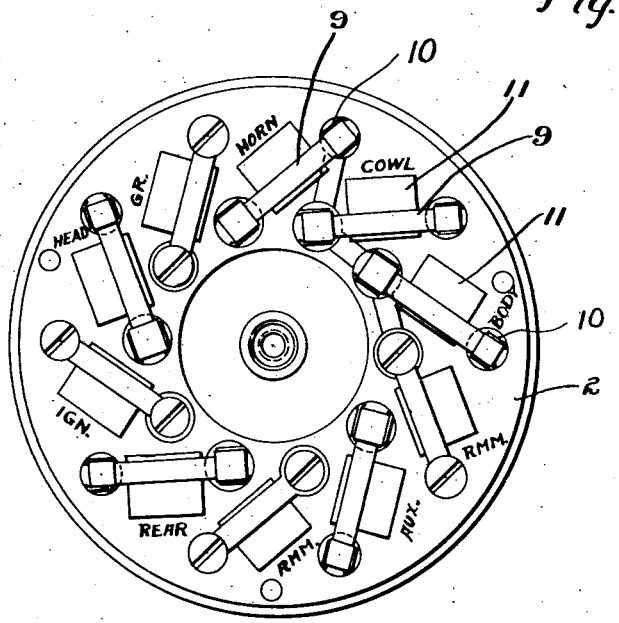
Fig. 5 is a front end view of the base member illustrating the fuse connections, the cover plate being removed.

Reference may now be had to Fig. 7 which illustrates the electrical system of an automobile embodying a junction block arranged in accordance with my invention. As shown in Fig. 7 and indicated by appropriate legends in Fig. 1, the terminal members 12 of the detachable member 3 are respectively connected to an electric horn 23, a ground connection 24, headlights 25, ignition mechanism of a gas engine 26, rear lamp 27, a storage battery 28, auxiliary lamps 29 and a relay 30.

The terminal members 8 of the base member 2 are respectively connected to the several terminals of a combined ignition and lighting switch 32, an ammeter 33, a body lamp 34 and a cowl lamp 35. It will be understood that the several circuits are controlled in a well-known manner by means of the usual switches mounted adjacent to the seat of the driver of the vehicle.

The advantages of a junction block constructed in accordance with my invention will be appreciated by those skilled in the art of manufacturing and repairing motor vehicles. By means of its use, the electrical circuits of the respective portions of a motor vehicle may be completed prior to the assembling of the vehicle and the parts of the vehicle may be separated easily and conveniently without disturbing the connections of the system.

I claim as my invention:

1. A separable junction block for motor vehicles comprising two separable members having corresponding detachably-connected terminal members for connection to the electrical circuits of the chassis and the body portions, respectively, of a motor vehicle and having, also, detachably connected handle members for retaining said separable members in operative relation.

2. A junction block comprising three separable members in axial alinement, of manually-operable means for securing said parts in operative relation and for serving as handles for the external members in separating them from the intermediate member.

3. The combination for use with an automobile having a chassis and a body provided with an instrument board, of electrically operated devices adapted to be carried by said automobile, an electric circuit for said devices having a part thereof adapted to be mounted on said chassis and another part thereof adapted to be mounted on said body, a junction block mounted on said instrument board and having two series of connected contact terminals, the terminals of each series being connected to one of said parts of said circuit, a removable cover plate for said junction block, and a handle engaging said cover and detachably securing said cover to the remainder of said block.

4. The combination for use with an automobile having a chassis and a body, of a plurality of electrically operated devices adapted to be carried by said body, an electric circuit for said devices comprising a series of conductors adapted to be carried by said chassis and another series of conductors adapted to be carried by said body, an insulating member having a plurality of terminals connected to one of said series of conductors, a second insulating member having a plurality of terminals connected to the other of said series of conductors, two series of contact members each carried by one of said insulating members and each connected to one of said terminals of one said insulating members, each contact member of one series being adapted to coact with a contact member of the other series, and a handle member having a permanent movable connection with one of said insulating members and detachably engaging the other of said insulating members for maintaining said contacts in engagement with each other.

5. A junction block for automobile circuits comprising an insulating member having an annular ring carried thereby, a plurality of contacting socket members mounted in said insulating member, a plurality of terminal members mounted in said insulating member, means including a series of fuses located within said annular ring for connecting each of said socket members with one of said terminal members, a second insulating member adapted to seat on said first named insulating member on the side thereof opposite said annular ring, a plurality of terminal members carried by said second insulating member, a plurality of conducting members each connected to one of said last named terminal members, a central post carried by said first named insulating member, a cover plate mounted on said annular ring over said fuses, and a pair of axially located handle members connected to said second named insulating member and said cover plate respectively and threadedly engaging said post.

6. A junction block for automobile circuits comprising a pair of insulating members, two series of electrical contact members each carried by one of said insulating members and each adapted for detachable engagement with a contact member carried by the other insulating member, and a handle rotatably engaging one of said insulating members and threadedly engaging the other of said insulating members for securing said insulating members together, said handle having a part cooperating with one of said insulating members for effecting separation of said insulating members upon rotation of said handle in one direction.

7. A junction block for automobile circuits comprising an intermediate insulating member, a plurality of contacts carried by said insulating member, a second insulating member having contacts adapted for detachable engagement with said first named contacts, said intermediate insulating member having a chamber, a cover for said chamber, and a pair of rotatable handle members in axial alignment for detachably securing said second named insulating member and said cover plate to said intermediate insulating member and for effecting positive separation thereof upon rotation.

In testimony whereof, I have hereunto subscribed my name this 6th day of September, 1921.

J. STANLEY KINNEY.